(12) United States Patent
Trifonov et al.

(10) Patent No.: US 8,086,049 B2
(45) Date of Patent: Dec. 27, 2011

(54) ITERATIVE FISHER LINEAR DISCRIMINANT ANALYSIS

(75) Inventors: Mikhail Ivanovich Trifonov, Saint Petersburg (RU); Leonid Borisovich Lalyko, Saint Petersburg (RU)

(73) Assignee: Corel Corporation, Ottawa (CA)

( * ) Notice: Subject to any disclaimer, the term of this patent is extended or adjusted under 35 U.S.C. 154(b) by 0 days.

(21) Appl. No.: 12/799,459

(22) Filed: Apr. 26, 2010

(65) Prior Publication Data

US 2010/0215269 A1    Aug. 26, 2010

Related U.S. Application Data

(63) Continuation of application No. 10/888,441, filed on Jul. 9, 2004, now Pat. No. 7,720,291.

(51) Int. Cl.
*G06K 9/62* (2006.01)
(52) U.S. Cl. ........................ 382/225; 382/159
(58) Field of Classification Search .......... 382/225
See application file for complete search history.

(56) References Cited

U.S. PATENT DOCUMENTS

| | | | | |
|---|---|---|---|---|
| 5,671,294 A * | 9/1997 | Rogers et al. | ........ | 382/228 |
| 5,926,804 A * | 7/1999 | Tufts et al. | ........ | 706/25 |
| 6,035,057 A * | 3/2000 | Hoffman | ........ | 382/159 |
| 6,036,057 A | 3/2000 | Poutiatine | | |
| 6,337,927 B1 * | 1/2002 | Elad et al. | ........ | 382/225 |
| 6,353,814 B1 * | 3/2002 | Weng | ........ | 706/12 |
| 6,424,745 B1 * | 7/2002 | Hansen et al. | ........ | 382/191 |
| 6,469,706 B1 * | 10/2002 | Syeda-Mahmood | ........ | 345/589 |
| 2002/0138210 A1 * | 9/2002 | Wilkes et al. | ........ | 702/28 |
| 2002/0143761 A1 * | 10/2002 | Shimano et al. | ........ | 707/5 |
| 2003/0130799 A1 * | 7/2003 | Pidgeon et al. | ........ | 702/19 |
| 2003/0144746 A1 * | 7/2003 | Hsiung et al. | ........ | 700/28 |
| 2003/0185436 A1 * | 10/2003 | Smith | ........ | 382/159 |

OTHER PUBLICATIONS

Brown, Michael, Fisher'S Linear Discriminant, http://www.soe.ucsc.edu/research/compbio/genex/genexTR2html/node12.html, Nov. 5, 1999, p. 1.

* cited by examiner

*Primary Examiner* — David Zarka
(74) *Attorney, Agent, or Firm* — Pillsbury Winthrop Shaw Pittman LLP

(57) ABSTRACT

An exemplary method includes receiving an image data set that comprises a multidimensional property space and data classifiable into data classes, determining a projection vector for data of the data set wherein the projection vector maximizes a ratio of between-class scatter to within-class scatter, selecting a reference for the vector, projecting at least some of the data onto the vector, measuring distances from the reference to at least some of the data, classifying at least some of the data into data classes based on a nesting analysis of the distances, eliminating the classified data from the image data set to produce a modified image data set and deciding whether to determine another projection vector for the modified image data set. Various other exemplary methods, devices, systems, etc, are also disclosed.

29 Claims, 10 Drawing Sheets

ITERATIVE FISHER LINEAR DISCRIMINANT ANALYSIS

CROSS REFERENCE TO RELATED APPLICATIONS

The present application is a continuation of U.S. patent application Ser. No. 10/888,441, entitled "Iterative Fisher Linear Discriminant Analysis" and filed Jul. 9, 2004; which claims the benefit of priority to U.S. Provisional Application No. 60/545,652, entitled "Iterative Fisher Linear Discriminant Analysis" and filed Feb. 17, 2004; both of which are specifically incorporated by reference herein for all they disclose and teach.

FIELD OF INVENTION

Subject matter disclosed herein pertains to classifiers and, in particular, to classification schemes for classifying image data.

BACKGROUND

Data classification problems are commonly encountered in the technical arts. Examples include determining if tumors are malignant or benign, deciding if an article of manufacture is within tolerance or not, establishing the degree to which a combination of medical tests predicts a disease, classifying the content of an image, determining the relevance or irrelevance of information, and so on.

Given examples of classes or categories, each associated with multiple attributes or properties, the task is to determine regions of attribute space that define the classes. This makes it possible to subsequently categorize newly acquired data into classes based on the values of the attributes or properties of the data when the class membership is not known in advance.

Important aspects of the data as regards ease of classification include the number of classes contained in the data, the number of attributes for each datum, i.e., the dimensionality of the property space, and the nature of the distribution of classes within the property space. Many methods of classification are available. A number of the most useful are reviewed and compared in "A Comparison of Prediction Accuracy, Complexity and Training Time of Thirty-three Old and New Classification Algorithms", T.-S. Lim, W.-S. Loh and Y.-S. Shih, *Machine Learning*, v. 40, p. 203-229, 2000.

Four important characteristics of a classifier are the accuracy of classification, the training time required to achieve classification, how that training time scales with the number or classes and the dimensionality of the property space describing the data, and how consistent or robust is the performance of the classifier across different data sets.

One well-established method of classification is linear Fisher discriminant analysis, which is notable for an especially favorable combination of good classification accuracy coupled with consistency across different data sets and a low training time. The last is especially important where classification must occur in real-time or nearly so.

Fisher discriminant analysis defines directions in property space along which simultaneously the between-class variance is maximized and the within-class variance is minimized. In other words, directions in property space are sought which separate the class centers as widely as possible while simultaneously representing each class as compactly as possible. When there are two classes there is a single discriminant direction.

Depending on the dimensionality of the property space, a line, plane or hyperplane constructed normal to this direction may be used to separate the data into classes. The choice of the location of the plane (or its equivalent) along the discriminant coordinate depends on the classification task. For example, the location may be chosen to provide an equal error for classification of both classes. As another example, the location may be chosen to maximize the probability that all instances of a given class are correctly detected without regard to false positive identification of the remaining class. When there are more than two classes Fisher discriminant analysis provides a family of discriminant direction vectors, one fewer in number than the number of classes. Planes can be positioned along these vectors to pairwise separate classes.

A concept related to Fisher discriminant analysis is principal component analysis, otherwise known as the Karhunen-Loeve transform. Its purpose is to transform the coordinates of a multi-dimensional property space so as to maximize the variance of the data along one of the new coordinates, which is the principal component. Unlike Fisher discriminant analysis, the objective is to determine a direction that maximizes the overall variance of the data without regard to the variance within classes. As a result of the transform, initial orthogonal property vectors become resulting orthogonal principal component vectors by rotation. In contrast, however, discriminant vectors are not, in general, orthogonal, having their directions determined by the distribution of class properties. Thus, the vectors defining, on the one hand, the discriminant directions and, on the other, the principal component directions are in general distinct and non-coincident.

Underlying the linear Fisher discriminant analysis is the idea that classes within the data have properties that are normally distributed, i.e. each property has a Gaussian distribution about a mean value. To the extent that the actual property distributions of the data violate this assumption the performance of this classifier degrades. That is especially the case when the distributions are multi-modal, i.e., when a given class is represented my multiple groups or clusters of properties that are well-separated within property space and interspersed with similar clusters representing other classes.

An alternative view of this problem is that a plane (or its equivalent) positioned normal to a discriminant direction is an insufficiently flexible entity to describe the boundary between modes or clusters within property space. The difficulty is readily appreciated with a simple example. Given two classes in a two dimensional property plane, if the class distributions lie on a line such that a single property distribution for class 1 is flanked on either side by distributions for class 2, no single straight line will completely separate the two sets of property distributions.

It is to cope with problems such as this that a wealth of various classifiers has been devised. For example, one technique imposes a classification tree on the data using discriminant analysis to determine the branching at each level of the tree (see "Split Selection Methods for Classification Trees", W.-Y. Loh and Y.-S. Shih, *Statistica Sinica*, v. 7, p. 815-840, 1997). However, the optimal estimation of the tree requires considerable extra computation and the method is more than an order of magnitude slower than simple linear Fisher discriminant analysis.

In view of the fact that very few classifiers combine the speed and accuracy of linear discriminant analysis, there is a need to improve the classification accuracy of this classifier for data with complex multi-modal attribute distributions while maintaining a minimal impact on the classification time. Various exemplary methods, devices, systems, etc., disclosed herein aim to address this need and/or other needs pertaining to classification of data such as image data.

DETAILED DESCRIPTION

Described herein are various exemplary methods, devices, systems, etc., that provide an iterative classifier based on linear Fisher discriminant analysis. For example, in one implementation, a classifier is provided in which property distances are projected onto a discriminant vector to form property histograms. Classification may rely on such property histograms wherein a nesting analysis has the objective of identifying data within classes and possibly eliminating correctly classified data. Where correctly classified data are eliminated, remaining data may be reclassified using a subsequent linear Fisher discriminant analysis. The process may be iterated until full classification is achieved or no further simplification is possible.

Various exemplary methods, devices, systems, etc., optionally include projection of data onto more than one projection vector and subsequent formation of one or more property histograms. For example, one projection vector may arise from a linear discriminant analysis while another projection vector may arise from a principle component analysis. In this example, a histogram or histograms may be formed for each projection vector and a decision made as to which vector allows for more accurate discrimination between classes and hence classification of data. A criterion for this decision may consider which approach results in a maximal simplification of the data. A nesting analysis of histogram information may be employed for decision making and/or classification of data. Correctly classified data may be identified and eliminated, as appropriate, and the remaining data subject to reclassification using one or both of the projection analyses. The process is may be iterated until full classification is achieved or no further simplification is possible.

Graphical Representation of a Two-Class Model

Figure 1A:
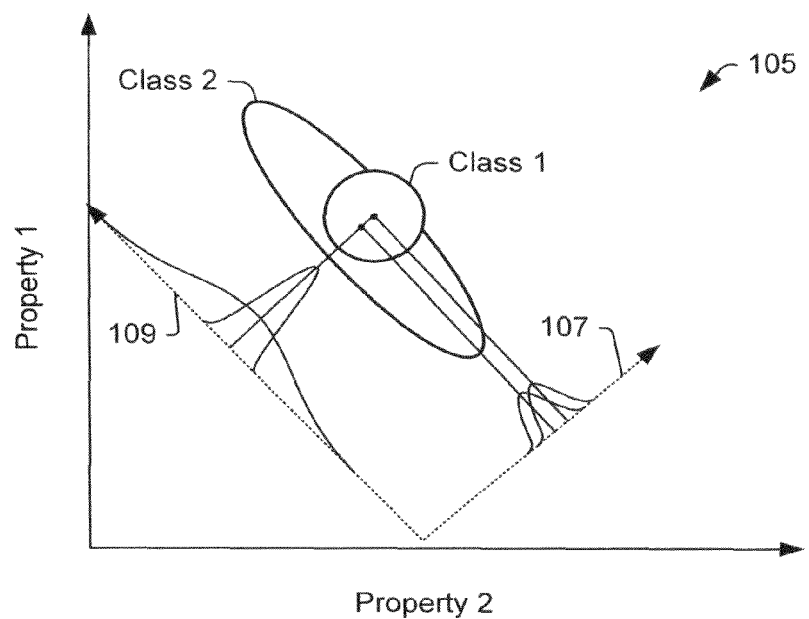
FIGS. 1A and 1B illustrate two scenarios for classification of a two-class model.
Figure 1B:
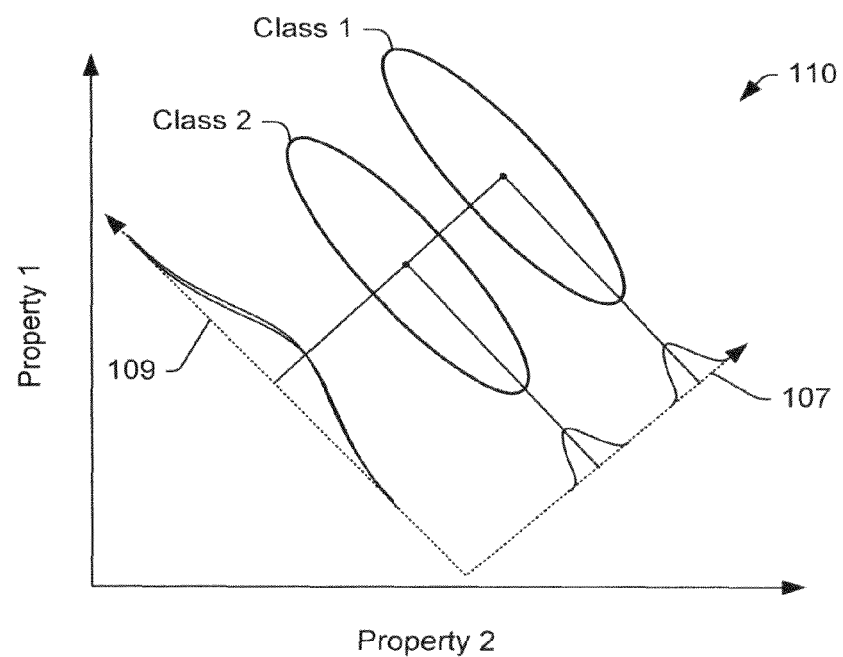

FIGS. 1A and 1B show graphical representations of two scenarios of a two-class model. In a first scenario, as illustrated in FIG. 1A, a plot 105 of a first property versus a second property (e.g., a property space) includes data within a first class and data within a second class. One direction 107 in the property space is associated with an analysis that aims to maximize variance between classes and minimize variance within classes while another direction 109 is associated with an analysis that aims to maximize overall variance. In higher dimension property spaces, such classes may be defined using more than two dimensions. Consider a three-dimensional space wherein a class may be definable by a "volume". Extension beyond a two-dimensional property space is discussed further below.

In this scenario, upon projection of the class data onto the direction 107, the classification ability of the analysis resulting in the direction 107 is quite limited due to the relationship of the classes in the property space. Upon projection of the class data onto the direction 109, the classification ability of the analysis resulting in the direction 109 has arguably more potential. Thus, the scenario of plot 105 demonstrates an instance where an analysis that seeks to maximize overall variance may provide useful information for classifying data in a property space. Further, the scenario of plot 105 demonstrates an instance where an analysis that seeks to maximize variance between classes and minimize variance within classes may be limited in usefulness.

In a second scenario, as illustrated in FIG. 1B, a plot 110 of a first property versus a second property (e.g., a property space) includes data within a first class and data within a second class. One direction 107 in the property space is associated with an analysis that aims to maximize variance between classes and minimize variance within classes while another direction 109 is associated with an analysis that aims to maximize overall variance. In the second scenario, the relationship between the two classes differs from that of the first scenario. In particular, the data of class 1 does not overlap with the data of class 2. Consequently, a projection of the data in the property space onto the direction 107 allows for identification of two distinct classes of data. In contrast, a projection of the data in the property space onto the direction 109 provides little information to aid in classification of the data into two distinct classes.

Thus, the scenario of plot 110 demonstrates an instance where an analysis that seeks to maximize variance between classes and to minimize variance within classes may provide useful information for classifying data in a property space. Further, the scenario of plot 110 demonstrates an instance where an analysis that seeks to maximize overall variance may be limited in usefulness.

Figure 2A:
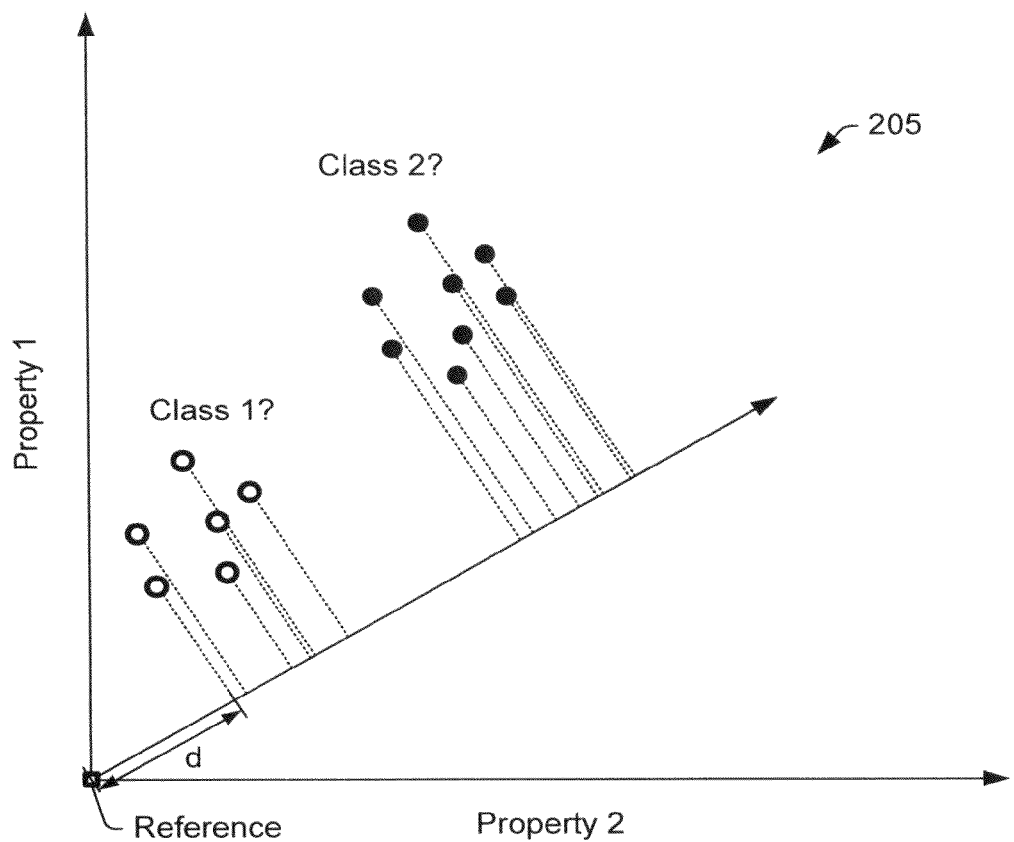
FIGS. 2A and 2B illustrate exemplary techniques for projecting data and binning information.
Figure 2B:
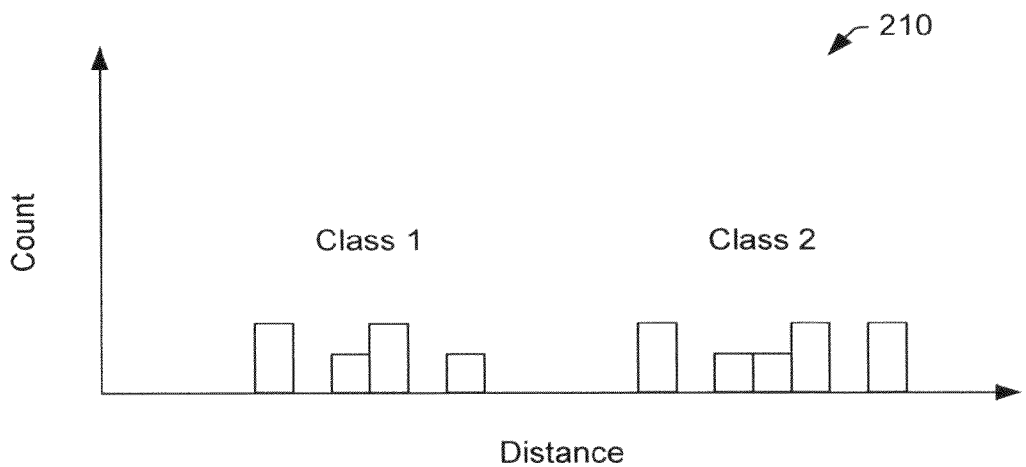

FIGS. 2A and 2B show additional exemplary concepts graphically. A property space plot 205, as illustrated in FIG. 2A, includes data and a direction resulting from an analysis that aims to maximize between class variance while minimizing within class variance. The data are projected onto this direction to generate various points and a reference is chosen. Measurement of distances then occurs between the reference and the various points. A plot 210 of distance versus counts (e.g., a histogram), as illustrated in FIG. 2B, is formed by binning the measured distances. A plot such as the plot 210 may be used in classifying the data. For example, in the plot 205, a general observation of the data may not readily discern whether classes exist; however, upon formation of a distance versus count plot or histogram, the existence of classes may readily be discerned. In the example of FIG. 2B, the plot 210 indicates that two classes appear to exist. Further, the plot 210 may be deemed one histogram or two histograms, for example, one for each class.

The plots of FIGS. 1A, 1B, 2A, and 2B illustrate manners in which data and/or class regions (e.g., class properties) may be analyzed. In particular, analyses such as linear discriminant analysis and principle component analysis may be used with respect to class properties and/or data. As already mentioned, linear discriminant analysis aims to maximize between class variance while minimizing within-class variance and principle component analysis aims to maximize overall variance. Further details of such analyses appear below.

Various exemplary methods, devices, systems, etc., described herein optionally include projecting data onto a direction in a property space, measuring distances for projected data and binning distances. Such binned information may allow for identification of classes and class members (i.e., class data). Prior to discussion of further details of various exemplary methods, devices, systems, etc., an overview of mathematics germane to various analyses is presented.

Mathematical Details of Analyses

Definition of Variables

Two analyses that may be used in various exemplary methods, devices, systems, etc., are Fisher linear discriminant analysis and principle component analysis. In order to describe the mathematics of Fisher linear discriminant analysis and of principal component analysis it is convenient to first define certain variables as follows.

Let the training set data for the classification be represented by $x_i \in R^d$, $i=1, \ldots, M$. Each datum $x_i$ in the set is associated with a column feature vector $x_i=(x_{i1}, x_{i2}, \ldots, x_{id})^T$, in which each component $x_{ik}$ represents the kth property or attribute of the ith datum $x_i$.

Let M be the total number of sample data, where each datum is indexed by $i=1,2,\ldots M$. For example, if the training set comprised image pixels of different colors in RGB color space, there would be M pixels altogether in the training set, each represented by an RGB color value. The dimensionality of the property space is d=3 and each pixel i is represented as a 3D color vector, where $x_{i1}$=red value of the pixel, $x_{i2}$=green value of the pixel, $x_{i3}$=blue value of the pixel.

Let the sample data be divided into classes $X_j$ indexed by j of which there are a total of N classes, i.e. $j=1,2,\ldots N$. Within each class j let the number of samples or data be $m_j$, which implies that:

$$\sum_{j=1}^{N} m_j = M.$$

Let $\mu_j=(\mu_{j1}, \mu_{j2}, \ldots, \mu_{jd})^T$ be the mean vector of class j, such that:

$$\mu_j = \frac{1}{m_j} \sum_{x_t \in X_j} x_t, \; j=1, \ldots, N$$

and let $\mu$ be the total mean vector for all classes taken together such that:

$$\mu = \frac{1}{M} \sum_{j=1}^{N} m_j \mu_j.$$

Define $S_j$ to be the scatter matrix of class j, i.e.

$$S_j = \sum_{x_t \in X_j} (x_t - \mu_j) \cdot (x_t - \mu_j)^T.$$

The matrix $S_j$ is proportional to the corresponding covariance matrix $K_j$ of class j, i.e. $S_j=m_j \cdot K_j$, so that:

$$K_j = \frac{1}{m_j} \sum_{x_t \in X_j} (x_t - \mu_j) \cdot (x_t - \mu_j)^T.$$

Similarly let K be the covariance matrix of all samples (entire training data set), i.e.

$$K = \frac{1}{M} \sum_{t=1}^{M} (x_t - \mu) \cdot (x_t - \mu)^T.$$

Additionally define matrix $S_W$ as:

$$S_W = \sum_{j=1}^{N} S_j$$

and let $S_B$ be the scatter matrix of the class centers, i.e.

$$S_B = \sum_{j=1}^{N} m_j (\mu_j - \mu) \cdot (\mu_j - \mu)^T.$$

With the variables defined we can proceed to a description of analytical methods. One objective of linear discriminant analysis is to perform dimensionality reduction while preserving as much of the class discriminatory information as possible by finding directions in property space along which classes are best separated. This is done by simultaneously considering the scatter within classes (as represented by the matrix $S_W$) and between classes (as represented by matrix $S_B$). In contrast, principal component analysis has as an objective the reduction of dimensionality space by finding directions in property space that maximally account for the variation in the overall sample data without regard to class membership. This is done by using the overall sample covariance (represented by matrix K) as a basis for analysis.

Linear Discriminant Analysis

One of the goals of linear discriminant analysis (LDA) is to find a projection w from $R^d$ original property space ($x_i \in R^d$) to a sub-space of reduced dimensionality $R^{N-1}$ by constructing N−1 separating hyperplanes, such that the projection of the class centers $\mu_j$ onto the lower dimension space has the maximum variance (i.e., the centers are as separated from each other as possible) and such that the projections of the points $x_t \in X_j$ are clustered as close as possible to the projections of the centers $\mu_j$. This goal can be formalized into the following optimization functional:

$$J(w) = \frac{|w^T S_B w|}{|w^T S_W w|} \Rightarrow \max_w,$$

where vertical bars |.| denote the determinant of a matrix. Finding the d×(N−1) rectangular matrix w maximizing J(w) is equivalent to the solution of the following generalized eigenvalue problem:

$$S_B w = \lambda S_W w.$$

Here λ is a real number known as the eigenvalue, which represents discrimination power. Each eigenvalue is associated with a column of matrix w, which is known as the eigenvector and represents the contribution of each property to the eigenvalue. The eigenvalues λ are found as the roots of the characteristic equation:

$$|S_B - \lambda \cdot S_W| = 0.$$

After sorting the solutions λ in order of decreasing magnitude, i.e., $\lambda_1 \geq \lambda_2 \geq \ldots \geq \lambda_{n-1}$ one can then determine the corresponding eigenvectors $w_i$ by solving $$(S_B - \lambda_i \cdot S_W) \cdot w_i = 0, i=1, \ldots, N-1.$$

Principal Component Analysis

One of the goals of principal component analysis (PCA) is a variable reduction procedure typically resulting in a relatively small number of components that account for most of the variance in a set of observed variables. The reduction is achieved by the linear transformation of the original coordinates $x=(x_1, x_2, \ldots, x_d)^T$ in $R^d$ space into new series of lower dimension principal components, say $z=(z_1, \ldots, z_p)$ in $R^p$ (p<d) defined as $$z_i = \sum_{k=1}^{d} U_{ik} x_k, i = 1, \ldots, p; p < d;$$

that are orthogonal (i.e., uncorrelated). Here $U_{ik}$ is k-th component of i-th eigenvector $U_i=(U_{i1}, \ldots, U_{ik}, \ldots, U_{id})^T$ of the covariance matrix, K, of all samples, i.e.

$$KU_i = \mu_i U_i,$$

where $\mu_i$ is the corresponding eigenvalue.

Geometrically, principal component analysis constructs a set of uncorrelated directions that are ordered by their variance. Thus, the first principal component $z_i$ is usually considered to have the maximum variance and explains the largest percentage of the total variance, the second PC explains the largest percentage of the remaining variance, and so on. Maximizing the variance of the first component is equivalent to the maximization of:

$$U_1^T K U_1.$$

Taking into account the normalization condition:

$$U_1^T U_1 = 1$$

$U_1=(U_{11}, \ldots, U_{1d})$ is the first eigenvector of the matrix K associated with the maximal eigenvalue $\mu_1$, i.e. $KU_1=\mu_1 U_1$. Each subsequent component $z_i$ (i=2, ..., p) contains the maximum variance for any axes orthogonal to the previous component and the eigenvector $U_i$ corresponding to it is defined as:

$$KU_i = \mu_i U_i, i=2, \ldots p; \mu_1 \geq \mu_2 \geq \ldots \geq \mu_p.$$

Thus, the $(U_1, \ldots, U_p)$ are defined as the p leading eigenvectors of K. The eigenvalue associated with each vector is the variance in that direction. For Gaussian data the principal components are the axes of an equiprobability ellipsoid.

In some situations directions with the most variance are especially relevant to clustering. However, since principal component analysis cares only about the scatter of the entire data set, the projection axes chosen might not provide good discrimination power. Nevertheless, the distribution of the data in the space of principal components differs from that in the original property space, whereas linear discriminant analysis merely partitions the original property space in a way that maximizes class separation. Accordingly, there can be advantages to the use of principal component analysis in conjunction with linear discriminant analysis.

In one exemplary implementation, an iterative classifier is provided based on linear Fisher discriminant analysis. According to such a classifier, property distances are optionally projected onto a vector to form property histograms. Such histograms may be subjected to nesting analysis, which may include objectives of, for example, identifying and eliminating correctly classified data. Where data elimination occurs, remaining data may be subjected to reclassification using linear Fisher discriminant analysis and/or other analyses. An exemplary method optionally includes such a process wherein iterations occur until full classification is achieved or no further simplification is possible.

The aforementioned mathematics aim to explain some basics of Fisher linear discriminant analysis and other analyses that generally pertain to variance of data.

Histograms, Formation and Classification

Various exemplary methods, devices, systems, etc., include formation of histograms and histogram nesting analysis. For ease of explanation such concepts will initially be presented for the case of two classes associated with multiple properties. Subsequently, the description will be extended to more than two classes.

Consider the eigenvector resulting from linear discriminant analysis, of which there is only one in the two-class case. This vector or projection vector provides a direction in sample property space. A reference plane normal to the vector may be constructed at any convenient location along the vector, for example through the origin of property space. For every datum a distance from the plane parallel to the vector direction may be computed and a histogram of these distances constructed. This is a histogram of the projection of the data onto the vector. This histogram contains distances for data that are part of the training set, which is labeled according to class membership. Accordingly, each distance in the histogram may be labeled by the class of the datum projected. Conceptually, this may be considered two separate histograms, one for the first class and one for the second class. In addition, various manners exist in arriving at such histograms, for example, use of a plane normal to a projection vector, selection of a reference point and projection of data onto a vector, etc.

Figure 3:
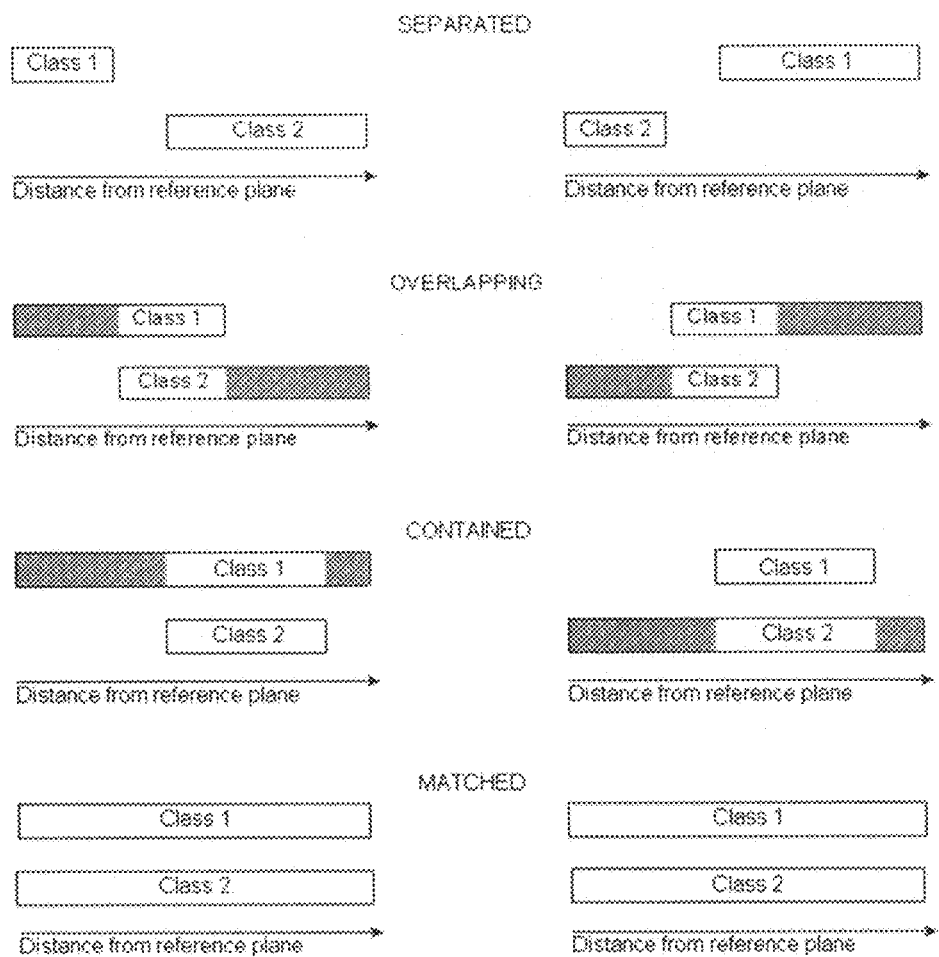
FIG. 3 illustrates an exemplary nesting analysis and exemplary relationships for binned information.

These two conceptual class histograms may have four relationships: separated, overlapped, enclosed and matched, as shown in FIG. 3, in which the width of each box represents the range of data enclosed within the histogram.

Nesting analysis of the histograms comprises considering these different cases and involves assignment of data to a class where possible, retaining unseparated or unclassified data for further analysis. In the separated case, the histograms of the two classes do not overlap and perfect classification of the training set data is achieved along the projection vector.

In some instances, a decision may be made about how to test data falling between the two class histograms including determining whether the instance may signal an unrepresentative training set. Such an instance may be addressed, for example, by using fitted distributions, including mixture models, in conjunction with Bayesian methods, or by partitioning the gap between histograms equally between the two classes.

In the overlapped case, class histograms overlap partially. Data outside the overlap region, which are indicated by shading, may be classified unambiguously. Two dividing planes normal to the projection vector and positioned at boundaries of the overlap region may be used to classify test data. Only the data in the histogram overlap region (i.e. between the dividing planes) are retained for a further iteration of analysis (e.g., LDA, PCA, etc.).

The contained case is rather similar, and one class histogram is completely contained within the other. This may occur as illustrated, in which case two dividing planes are again constructed to bound the overlap region. Alternatively, one or other end of the first class histogram may align with an end of the second class histogram. In this case only a single dividing plane is required, with the other data boundary being formed by the common histogram limits. Again, data in the overlap region are retained for another iteration of linear discriminant analysis or other analysis while data outside this interval are labeled with class membership.

The matched case arises when both class histograms have the same limits and range along the projection vector. This situation may be treated in several ways. For example, a class membership probability may be assigned by Bayesian techniques or by minimization of total classification error. In these cases complete classification is achieved. Alternatively, multiple dividing planes may be constructed within the histograms to enclose and classify regions that are present only in a single histogram. Remaining regions that are not classified are optionally retained for a further iteration of linear discriminant analysis or other analysis, which is illustrated in FIG. 4.

Figure 4:
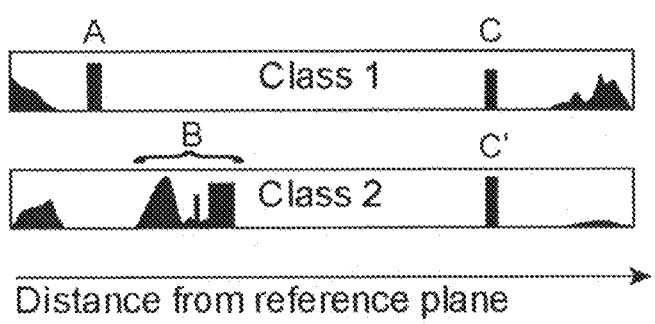
FIG. 4 illustrates an exemplary nesting analysis of binned distance information.

In FIG. 4, a region marked A in the Class 1 histogram has no corresponding distances in the Class 2 histogram. It may, therefore, be assigned to class 1. Similarly, the peaks marked B in the Class 2 histogram have no corresponding distances in the Class 1 histogram and may be assigned to class 2. In contrast, the peaks marked C and C' are common to both histograms and are retained for further iterations of linear discriminant analysis or other analysis.

Various exemplary methods, devices, systems, etc., optionally exclude data that have been classified in the course of nesting analysis from further consideration since they have already been assigned a class membership. In such instances, remaining data may be subject to another linear discriminant analysis or other analysis to receive a new vector and new projected histograms. The cycle of nesting analysis and analysis may be repeated until all the data have been classified.

By means of histogram nesting analysis a series of planes dividing property space may be constructed to supplement the planes (or plane in the case of binary classification) provided by vector analysis. By these means a more effective classification may be obtained.

While the preceding discussion was generally couched in terms of histograms derived from projection onto a vector stemming from an analysis such as linear discriminant analysis, projection onto a vector stemming from a principal component analysis may be used (e.g., the leading principle component vector, etc.). The latter approach is optionally beneficial for multimodal distributions such as those illustrated in FIG. 5, which for simplicity of illustration involves two classes each associated with two class properties.

As noted earlier, Fisher linear discriminant analysis is based on an assumed Gaussian distribution of classes and may be expected to have some difficulty coping when the data do not match such assumptions. In general, multimodal distributions can diminish the classifying ability of a classifier reliant on Fisher linear discriminant analysis.

Figure 5:
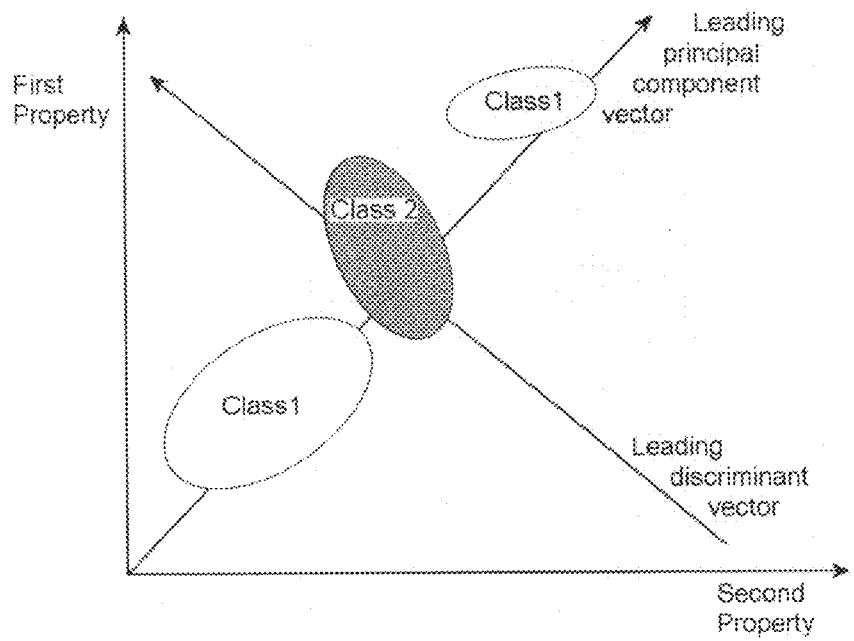
FIG. 5 illustrates an exemplary scenario comparing linear discriminant analysis and principle component analysis.

FIG. 5 shows two classes wherein class 1 has a significantly non-Gaussian distribution (e.g., multimodal, etc.). Projection of the class property vectors onto the leading linear discriminant analysis vector creates distributions of distances which overlap for the two classes. In contrast, projection of properties onto the leading principal component vector creates class histograms of the contained type where the histogram for class 2 lies within the histogram for class 1. Dividing planes along and normal to the principal component vector immediately lead to separation of the classes.

Accordingly, various exemplary methods, devices, systems, etc., include consideration of property projections on both a linear discriminant analysis vector and a principal component analysis vector. Criteria for choosing one projection over the other for nesting analysis may be chosen according to convenience, expedience, desired results, etc. For example, projections may be chosen that lead to classification of the largest number of data. However, it is preferred to choose a projection which leads to the classification of the largest range of the data at each stage. This has the benefit of generally reducing the number of discriminant analysis and projection iterations that must be performed to achieve complete classification. This objective may be achieved by choosing the projection that minimizes overlap of class histograms while maximizing the width of the histograms, so maximizing the range of projected distances that can be assigned to a class.

A number of auxiliary criteria may be used depending on the nature of the data and the classification problem being solved. For example, the distance between the means of the class histograms divided by the square root of the sum of the histogram variances along the discriminant vector may be used as a test. For large values of this quantity (i.e. compact and well-separated distributions) nesting analysis may be based solely on the linear discriminant analysis vector projection. For small values of the metric, an optimal projection vector may be chosen by testing or assessing both the linear discriminant analysis vector and the principal component analysis vector projections.

Other criteria may be used as well. For instance, other criteria may involve metrics based on histogram width ranges or histogram median values. In general the metrics may be chosen to minimize the overall amount of computation required to achieve classification by striking an optimal balance between effort or resources expended on nesting analysis relative to the effort or resources expended on multiple iterations of the process.

In the case of more than two classes the nesting analysis becomes more complex than that described for two classes. For more than two classes not only are there more pairwise relationships between classes to consider but there are also multiple discriminant vectors to consider, one fewer than the number of classes.

For N classes and a projection of class properties onto a single vector, the histogram of the first class must be compared with the histograms for N−1 remaining classes. The histogram of the second class must be compared with N−2 remaining class histograms, the histogram of the third class with N−3 remaining histograms, and so on. The total number of comparisons for a single projection is thus $0.5N(N-1)$. If these comparisons are performed for each of the N−1 vectors the total number of pairwise histogram comparisons becomes $0.5N(N-1)^2$.

While such comparisons are realistic for a relatively small number of classes such as three or four, the comparisons rapidly become unwieldy for a larger number of classes. However, considerable simplification is possible. For example, only the leading linear discriminant analysis vector, or possibly a leading few vectors, may be considered, optionally along with the leading principal component analysis vector. This is because the iterative nature of the classification does not require optimal classification from a given linear discriminant analysis in a series of such analyses and the use of the principal component vector can result in large regions of property space being assigned to a class in situations where linear discriminant analysis gives poor class separation.

Figure 6:
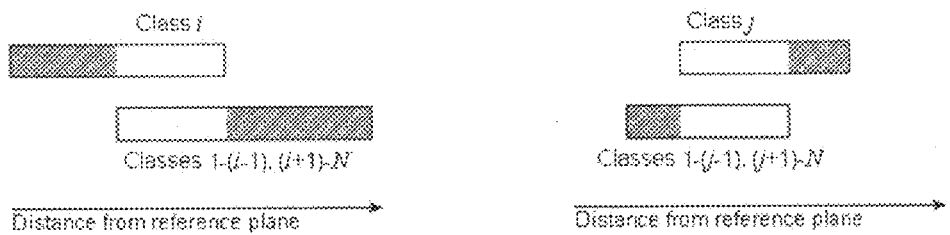
FIG. 6 illustrates an exemplary nesting analysis for a generic multiclass scenario.
Figure 6:
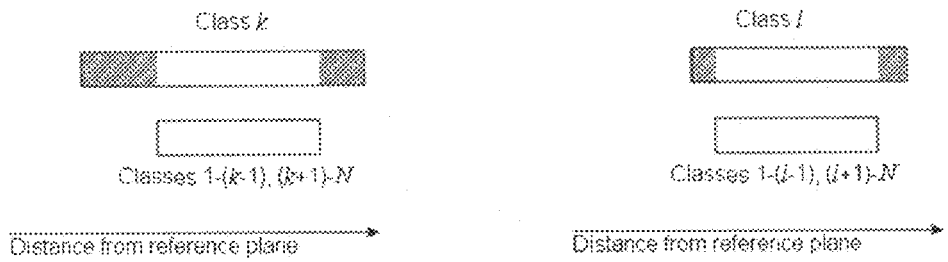

The nesting analysis may be simplified further by treating it as a two-class situation. First, the histogram of any class, j, that does not overlap with the histogram of the union of remaining classes may be used to assign membership of class j. Class j may then be excluded from further analysis. Second, the width range of each class histogram may be compared to the sum of the widths of the remaining class histograms. Then the histogram with the largest width relative to the width of the united histogram of the remaining classes may be chosen for assigning classes. Alternatively, the histogram with the least overlap with the united histogram of the remaining classes may be chosen for assigning classes. The situation is illustrated in FIG. 6, which contains several examples of schematic histograms labeled according to the classes they contain.

For the case of overlapping histograms, class i would be selected over class j for partitioning property space, since a larger range of property space may be assigned to class i than class j as illustrated by the sizes of the shaded regions. However, both class i and class j could also be used in conjunction with each other.

For the case of contained histograms, class k would be selected over class l for partitioning property space since a larger range of this space may be assigned to class k than to class l, though the classes could also be used in concert. Either class i in the case of overlap or class k in the case of containment may be chosen to partition property space depending on which class accounts for the largest fragment of property space. Preferably both class i and class k are used together to reduce the volume of property space so as to limit what is used in the next linear discriminant analysis iteration or other analysis iteration.

Additional possibilities are contemplated. For example, the range of property space assigned to a class may be compared against a threshold and, if it is insufficient, projection onto the leading principal component may be used for histogram nesting analysis. Similarly, if comparison of every class histogram with the histogram for the union of remaining classes leads to the matched histogram case, projection onto a principal component may be chosen. Alternatively, the next most significant linear discriminant analysis vector may be included in the nesting analysis.

Exemplary histogram analyses have been illustrated herein with respect to certain representative examples. However, it should be appreciated that these representative examples are only exemplary and are not intended to be limiting. Other alternative implementations are possible within the broad scope of nesting analysis if they are directed to reducing the number of data to be classified, or to improving the quality, accuracy or reliability of the partitioning of property space, or to increasing the efficiency or efficacy of classification.

Various Exemplary Methods

Figure 7:
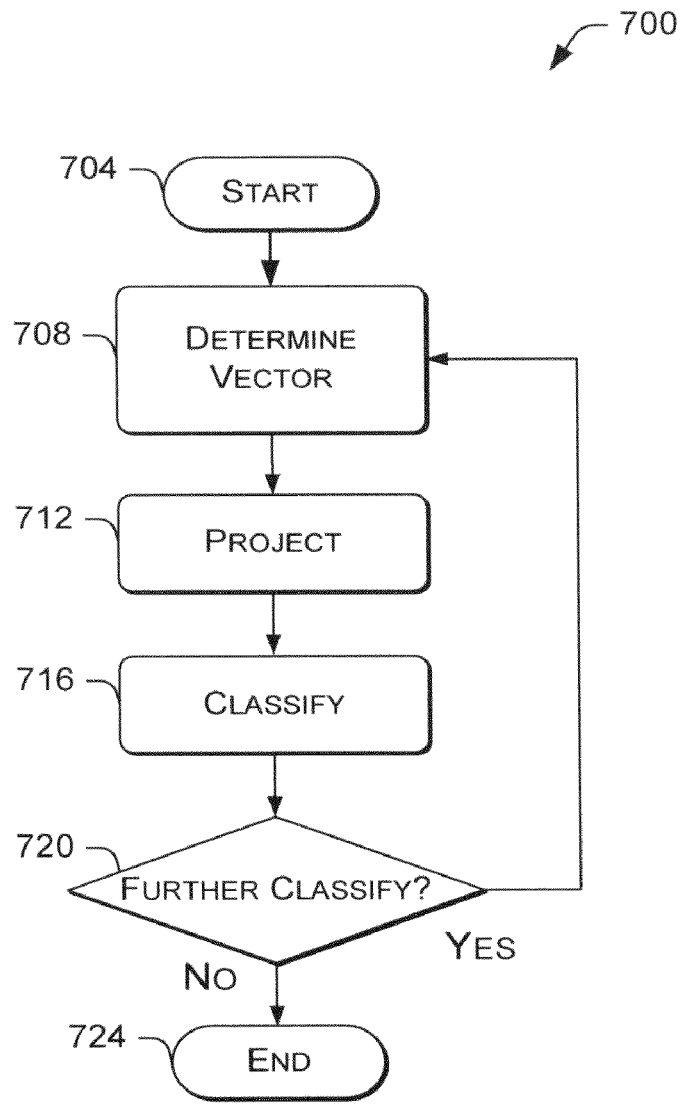
FIG. 7 illustrates an exemplary method for classifying data.

FIG. 7 shows an exemplary method 700 for classifying data in a multi-dimensional property space. The exemplary method 700 commences in a start block 704. Next, a determination block 708 determines a projection vector that, for example, aims to maximize between class variance and minimize within class variance of data. A projection block 712 follows that projects the data onto the projection vector. A classification block 716 relies on the projection to classify the data, for example, using histograms and a nesting analysis. The classification block 716 optionally includes eliminating data to form a modified data set. A decision block 720 follows that decides if further classification is required, possible and/or desirable. If the decision block 720 decides that no further classification need occur, then the exemplary method 700 terminates in an end block 724; however, upon a decision for more classification, the method 700 continues at the determination block 708, optionally after elimination of classified data to form a modified data set.

While the exemplary method 700 is described above with respect to data in a property space where classes may not be know a priori, an alternative example optionally uses property-based classes that are known a priori for generation of information germane to classifying. For example, a property-based class region may be defined and subject to the exemplary method 700 or a training data set may include data generated from known and perhaps well-defined property-based classes. In these examples, the classifying may be optimized to more readily identify classes and/or class data in a test data set.

Figure 8:
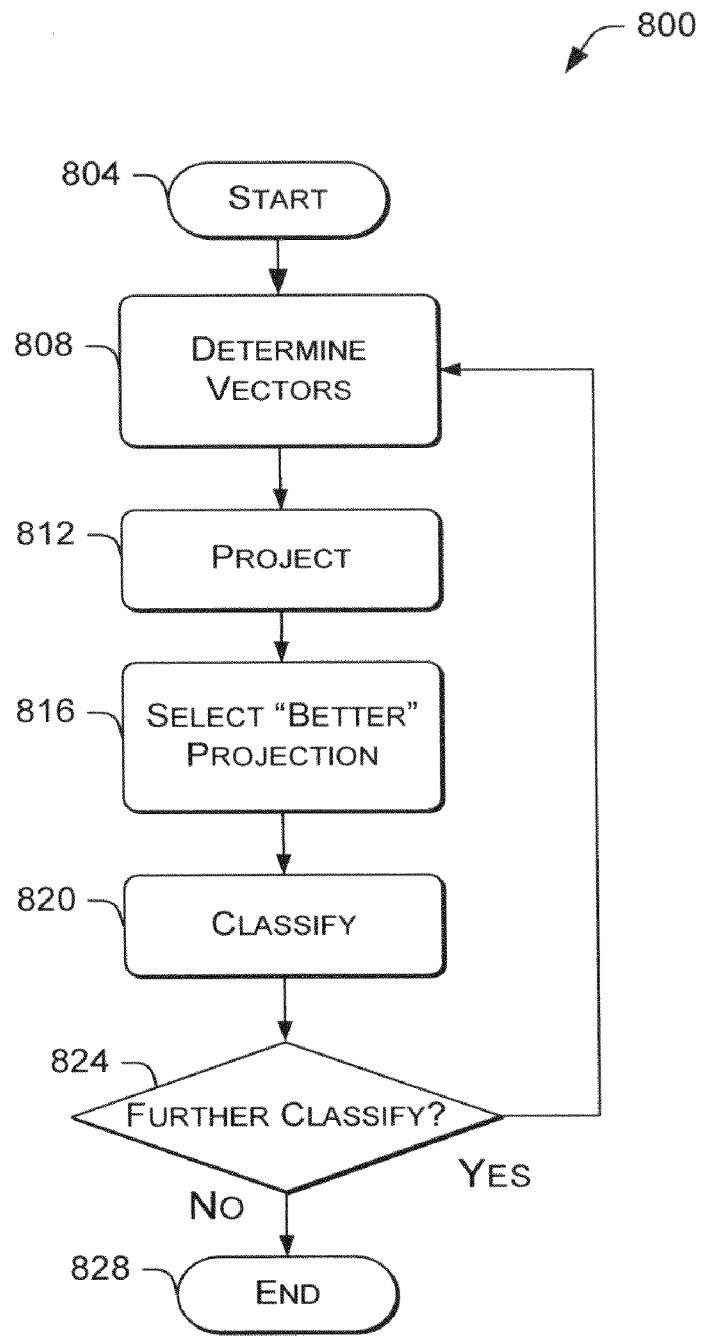
FIG. 8 illustrates an exemplary method for classifying data using one or more types of analyses (e.g., linear discriminant analysis, principle component analysis, etc.).

FIG. 8 shows an exemplary method 800 for classifying data in a multi-dimensional property space. The exemplary method 800 commences in a start block 804. Next, a determination block 808 determines more than one projection vector. Each projection vector may, for example, aim to maximize between class variance and minimize within class variance of data or aim to maximize overall variance of data. A projection block 812 follows that projects the data onto each of the projection vectors. A selection block 816 selects the better or best projection for subsequent use in the exemplary method 800 (e.g., according to one or more criteria). A classification block 820 relies on the selected projection to classify the data, for example, using histograms and a nesting analysis. The classification block 820 optionally includes eliminating data to form a modified data set. A decision block 824 follows that decides if further classification is required, possible and/or desirable. If the decision block 824 decides that no further classification need occur, then the exemplary method 800 terminates in an end block 828; however, upon a decision for more classification, the method 800 continues at the determination block 808, optionally after elimination of classified data to form a modified data set.

While the exemplary method 800 is described above with respect to data in a property space where classes may not be know a priori, an alternative example optionally uses property-based classes that are known a priori for generation of information germane to classifying. For example, a property-based class region may be defined and subject to the exemplary method 800 or a training data set may include data generated from known and perhaps well-defined property-based classes. In another example, training data is selected based on observation and/or one or more criteria to aid in defining property-based classes. In these examples, the classifying may be optimized to more readily identify classes and/or class data in a test data set (see, e.g., examples below wherein selection of some image data may occur prior to classification of other image data).

An exemplary method includes receiving an image data set that comprises a multidimensional property space and data classifiable into data classes, determining a projection vector for data of the data set wherein the projection vector maximizes a ratio of between-class scatter or variance to within-class scatter or variance, selecting a reference for the vector, projecting at least some of the data onto the vector, measuring distances from the reference to at least some of the data, classifying at least some of the data into data classes based on a nesting analysis of the distances, eliminating the classified data from the image data set to produce a modified image data set and deciding whether to determine another projection vector for the modified image data set. While this exemplary method includes projecting at least some of the data onto the vector, if, for example, a reference plane is selected then the measuring may measure distances substantially parallel to the vector to achieve the same result.

Various exemplary methods optionally include property space dimensions that include color property dimensions (e.g., a red property dimension, a green property dimension and a blue property dimension). Where color property dimensions are included in a property space, one or more data classes are optionally defined in part through use of a color vector.

As already mentioned, a linear discriminant analysis and/or a principle component analysis may be used to determine a projection vector or vectors where appropriate. In addition, in some instances, an analysis may result in a matrix that includes a plurality of vectors. Where a plurality of vectors occurs, the leading vector may have particular usefulness in classifying.

Various exemplary methods optionally rely on eigen analysis wherein eigenvalues and/or eigenvectors are involved, for example, determining a projection vector may include determining one or more eigenvalues and/or one or more eigenvectors.

Various exemplary methods determine a projection vector that maximizes variance between means of data classes wherein the means of data classes optionally are representable via mean vectors.

Various exemplary methods include selection of a reference wherein the reference is optionally a point, a line, a plane, a hyperplane, etc., the selection of which may depend on property space dimensions and/or reduction of property space dimension through one or more projection techniques. Where an exemplary method includes selection of a plane normal to a projection vector, measuring distances may occur for distances parallel to the projection vector.

Various exemplary methods optionally include binning distances to form one or more histograms. Various exemplary methods optionally include nesting analysis that determines a relationship between two or more histograms or regions within a single histogram. Such a relationship may include separated, overlapped, enclosed and matched or another relationship.

In instances where a modified image data set is created, an exemplary method optionally includes displaying the modified image data set on a display device. An exemplary method may optionally display classified data on a display device, if appropriate.

In deciding whether to continue with a subsequent iteration, an exemplary method may optionally consider classified data, unclassified data or classified data and unclassified data. A decision may include determining whether to perform a principle component analysis on at least some of the data, determining whether to determine a projection vector that maximizes overall variance of at least some of the data, and/or other determining. A decision may include consideration of range of data classified, consideration of width of a histogram formed by binned distances, and/or one or more other considerations.

An exemplary method optionally includes displaying an image data set and selecting one or more regions of the image wherein the selecting acts to define one or more data classes. In such instances, the selecting optionally acts to select one or more regions to keep and one or more regions to drop from the image.

An exemplary method includes receiving an image data set in a multidimensional property space that comprises data classifiable into data classes, determining a projection vector that maximizes overall variance of the data of the image data set, determining a projection vector that maximizes variance between classes of the image data set and minimizes variance within classes of the image data set, deciding which vector allows for distinguishing more classes, projecting at least some of the data onto the vector that allows for distinguishing more classes, classifying at least some of the data based on the projecting, eliminating at least some of the data from the image data set based on the classifying to form a modified image data set and determining one or more additional projection vectors selected from a group consisting of projection vectors that maximize overall variance and projection vectors that maximize variance between classes and minimize variance within classes.

Such an exemplary method optionally includes binning distances to form one or more histograms (e.g., as part of classifying). Classifying may optionally include nesting analysis or analyses. For example, classifying may include binning distances to form one or more histograms and a nesting analysis of the one or more histograms.

Such an exemplary method optionally includes deciding whether to determine another projection vector that maximizes variance between classes of the modified image data set and minimizes variance within classes of the modified image data set and/or deciding whether to determine another projection vector that maximizes overall variance.

Various exemplary methods are optionally performed using one or more computer-readable media that include instructions capable of execution in conjunction with a processor to perform at least some aspects of the exemplary method.

EXAMPLES

An example of practical utility of the various exemplary implementations described herein can be illustrated with a color classification problem, which starts with a color image in which each pixel is represented by a color vector. The vector is three-dimensional, corresponding to a red channel value, a green channel value, and a blue channel value. The task is to mark some colors as desired and others as undesired and then to achieve classification of the image into wanted and unwanted elements. The unwanted elements are erased to transparency, leaving only the desired elements visible in the image. Such a task may be accomplished by manually erasing individual pixels so that only the desired ones remain. However, this is an extremely laborious process requiring much dexterity and patience. This may be appreciated when it is borne in mind that digital camera images, for instance, contain several millions of pixels. Much time and effort could be saved if it were possible to mark some representative colors to keep and to discard and, on that basis, automatically erase what was undesired while retaining what was desired.

Figure 9A:
FIGS. 9A-D are images originally in color and presented in grayscale wherein the image of FIG. 9D is the result of an exemplary iterative classification technique and wherein the image of FIG. 9C is the result of a conventional classification technique.

In FIGS. 9A-D, the original images are in color and represented herein in grayscale. The description that follows refers to colors that may be appreciated to represent a normally exposed and normally processed color image of a woman. FIG. 9A shows an original image of a woman surrounded by a collection of color patches. It is desired to erase all the color patches and the background, leaving only the woman. Note that many of the red patches are very similar to the color tones in the skin of the woman.

Figure 9B:

FIG. 9B shows in white regions of the image that were roughly marked with a brush tool as containing colors that are to be kept. Shown in black are the colors marked as those that are to be dropped or erased. The keep and drop colors form a training set for classifying the remaining pixels of the image into those that should be erased and those that should be retained.

Figure 9C:

FIG. 9C shows the result of conventional linear discriminant analysis applied to this classification problem, where the checkerboard shows regions of the image that have become transparent. Red color patches are not removed but portions of the woman's skin and hair disappear. Additionally the black patch is not removed and some of the green patches do not become completely transparent. This level of classification is not useful relative to the large amount of additional manual correction required for the image to meet the separation requirements.

Figure 9D:
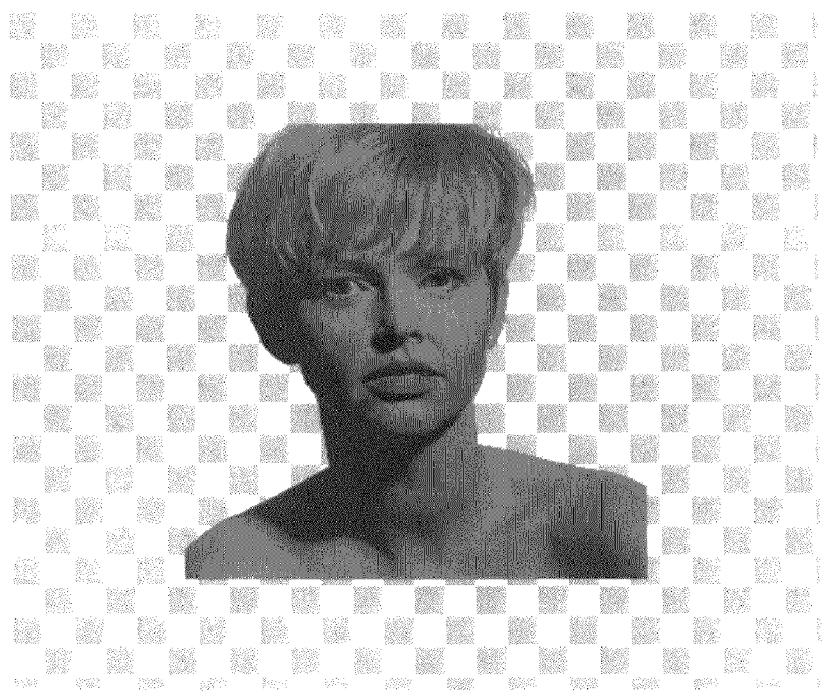

FIG. 9D shows the result of using an exemplary iterative linear discriminant analysis scheme in accordance with various exemplary implementations described herein, including the choice of projection onto a linear discriminant analysis or principal component analysis vector. The results are objectively satisfactory. All the color patches are removed and the woman is retrieved in her entirety, requiring only slight correction of three pixels on the woman's lip, two on the left earlobe and two on the right eye.

Figure 10A:
FIGS. 10A-C are images originally in color and presented in grayscale wherein the image of FIG. 10C is the result of an exemplary iterative classification technique.
Figure 10B:
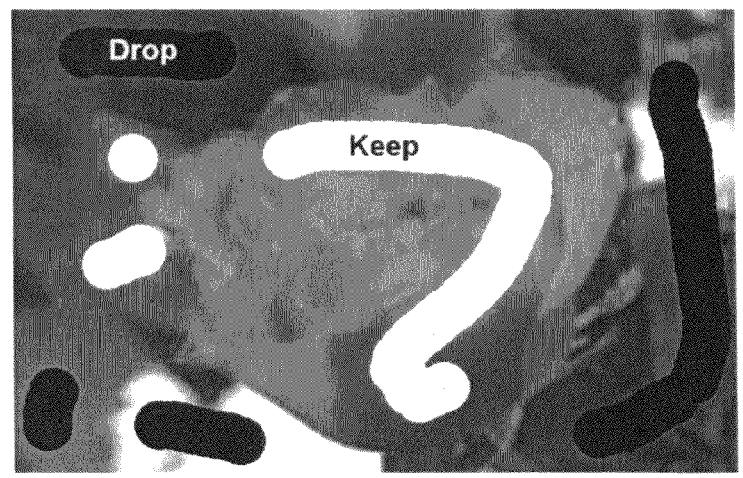
Figure 10C:
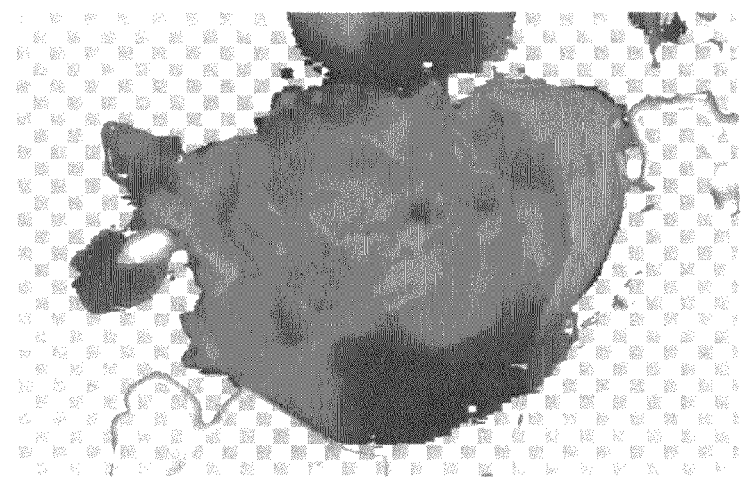

In FIGS. 10A-C, the original images are in color and represented herein in grayscale. The description that follows refers to colors that may be appreciated to represent a normally exposed and normally processed color image of flowers (e.g., a red rose and a blue and yellow iris).

FIGS. 10A-C show another example of color classification, involving an image of very poor quality containing numerous artifacts from excessive JPEG compression (FIG. 10A). Additionally, the colors of the flowers show lightness and saturation variations as well as spill-over of color from the JPEG compression. The task is to retain the blue and yellow and red flowers while removing the dark background, green leaves and white flowers.

FIG. 10A is the original image. FIG. 10B shows how keep and drop colors were roughly marked in the image with a brush tool. FIG. 10C shows the result of color classification using various exemplary methods described herein. Despite the poor quality of the image a good separation of the desired objects is obtained, requiring only a small amount of clean-up.

It will be appreciated that the various exemplary methods described herein may be implemented, all or in part, as one or more computer programs or modules that include computer-executable instructions and/or computer readable data. These computer programs may be stored or embodied in one or more types of computer-readable medium. As used herein, a computer-readable medium may be any available medium that can store and/or embody computer-executable instructions and that may be accessed by a computer or computing process. As used herein, a computer program product comprises a computer program or module embodied in or on a computer-readable medium.

Figure 11:
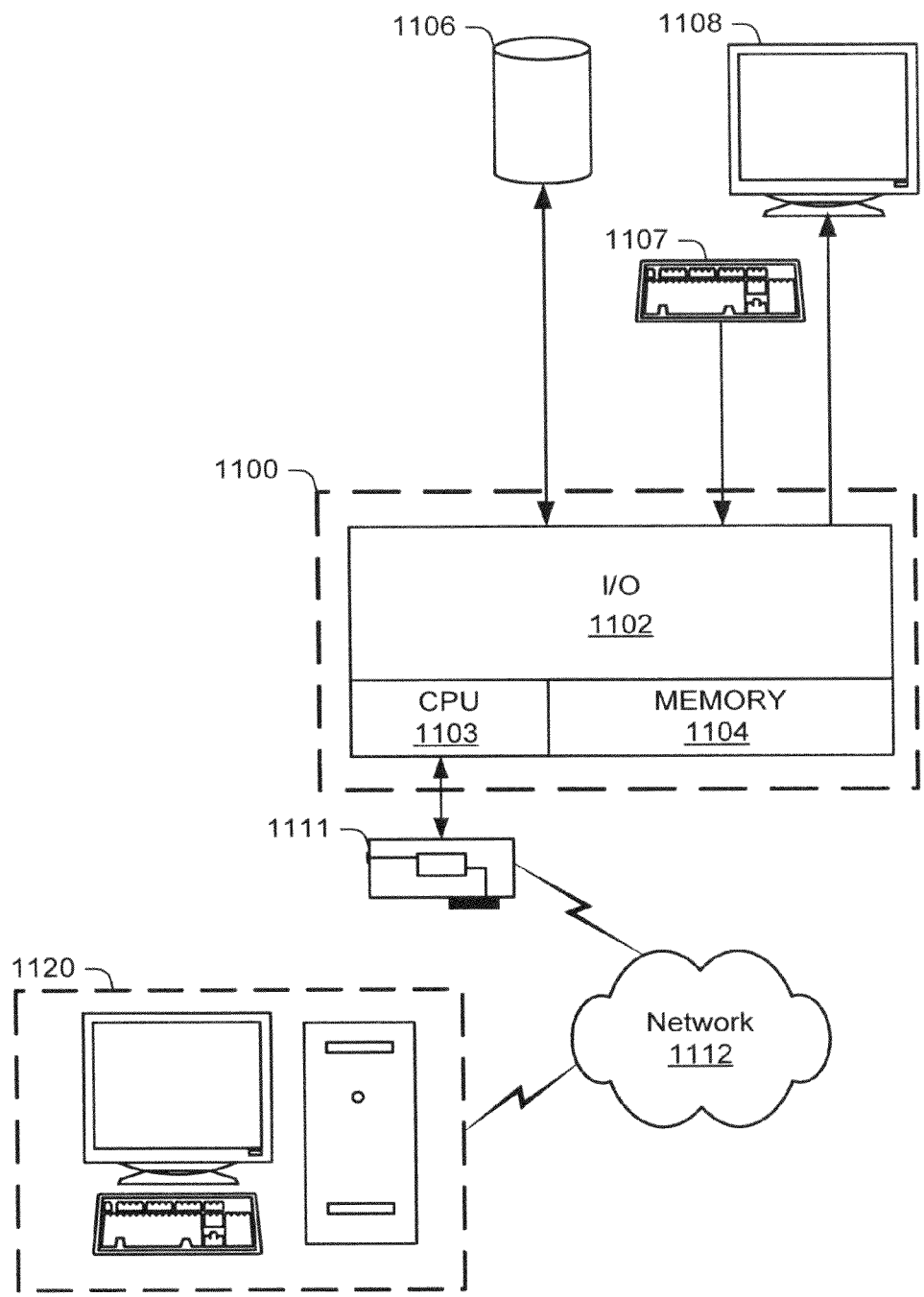
FIG. 11 illustrates an example computing system capable of implementing the various exemplary methods described herein.

Shown below in FIG. 11 is one example of a computing system 1100 in which the various methods described herein may be implemented. In its most basic configuration, the computing system 1100 includes a processing unit 1102, an input/output (I/O) section 1102, and a main memory 1104, including volatile and/or non-volatile memory. Additionally, the computing system may include or have access to various mass storage devices or systems 1106, including various removable and/or non-removable mass storage devices. Examples of mass storage devices might be, without limitation, various magnetic, optical, and/or non-volatile semiconductor memory, etc. In the case where the mass storage device comprises a number of storage devices, those devices may be distributed, such as across a computer network.

The computing system 1100 may have connected hereto input devices, such as a keyboard 1107, a mouse (not shown), various optical scanners or readers, microphones, video cameras, or various other computer input devices. The computing system 1100 may also have various output devices connected thereto, such as display devices 1108, speakers, printers, or various other computer output devices. The various input and output devices may be connected to the computing system 1100 via the I/O section 1102.

Other aspects of the computing system 1100 may include appropriate devices 1111 to establish network or communications connections to other devices, computers, networks, servers, etc., using either wired or wireless computer-readable media, and using various communications protocols. For example, the computing system 1100 is shown in FIG. 11 as being connected to a remote computing system 1120.

The computing system 1100 and the remote computing system 1120 may be a part of, or in communication with, computer networks 1112, such as Wide Area Networks (WAN), Local Area Network (LANs), the Internet, or any of various other computer networks.

Although various implementations set forth herein have been described in language specific to structural features and/or methodological steps, it is to be understood that the invention defined in the appended claims is not necessarily limited to the specific features or steps described. Rather, the specific features and steps are disclosed as representative forms of implementing the claimed invention.

What is claimed is:

1. A method comprising:
   determining a projection vector for data of an image data set in a multidimensional property space wherein the projection vector maximizes a ratio of between-class scatter to within-class scatter of the image data set using a processor;
   determining a reference on the projection vector using the processor;
   classifying at least some of the data into a plurality of unambiguously defined data classes based on a nesting analysis of distances of the data from the reference using the processor;
   eliminating at least some of the unambiguously defined classified data classes from the image data set based on the classification operation to produce a modified image data set containing only unclassified data using the processor; and
   determining another projection vector for the unclassified data of the modified image data set that maximizes a ratio of between-class scatter to within-class scatter of the modified image data set using the processor.

2. The method of claim 1, wherein the data classes comprise a data class defined by at least a color vector.

3. The method of claim 1, wherein the determining a projection vector operation comprises linear discriminant analysis.

4. The method of claim 1, wherein the determining a projection vector comprises determining a leading discriminant vector.

5. The method of claim 1, wherein the determining a projection vector operation comprises determining one or more eigenvalues.

6. The method of claim 1, wherein the projection vector comprises an eigenvector.

7. The method of claim 1, wherein the projection vector maximizes variance between means of data classes.

8. The method of claim 7, wherein the means of data classes comprise mean vectors.

9. The method of claim 1, wherein the classifying operation comprises binning the distances to form one or more histograms.

10. The method of claim 1, wherein the nesting analysis comprises determining a relationship between two histograms.

11. The method of claim 1, further comprising:
displaying the modified image data set on a display device.

12. The method of claim 1, further comprising:
displaying the classified data on a display device.

13. The method of claim 1, further comprising:
displaying the image data set as an image to a user; and
selecting one or more regions of the image which define one or more of the data classes.

14. The method of claim 13, wherein the selecting operation further selects one or more regions to keep and one or more regions to drop from the image.

15. The method of claim 1, further comprising:
receiving the image data set that comprises a multidimensional property space and the data classifiable into the data classes.

16. The method of claim 1, further comprising:
selecting the reference for the projection vector.

17. The method of claim 1, further comprising:
projecting some of the data onto the projection vector.

18. The method of claim 1, further comprising:
measuring distances from the reference to at least some of the data.

19. A method comprising:
receiving an image data set in a multidimensional property space that comprises data classifiable into data classes;
determining a projection vector for data of the data set wherein the projection vector maximizes a ratio of between-class scatter to within-class scatter using a processor;
selecting a reference for the projection vector;
projecting at least some of the data onto the projection vector;
measuring distances from the reference to at least some of the data;
classifying at least some of the data into a plurality of unambiguously defined data classes based on a nesting analysis of the distances using the processor;
eliminating at least some of the unambiguously classified data from the image data set to produce a modified image data set containing only unclassified data using the processor; and
determining another projection vector for the unclassified data of the modified image data set using the processor.

20. The method of claim 19, wherein the dimensions of the property space comprise color property dimensions.

21. The method of claim 19, wherein the dimensions of the property space comprise a red property dimension, a green property dimension, and a blue property dimension.

22. The method of claim 19, wherein the selecting operation comprises selecting a plane normal to the projection vector and the measuring comprises measuring distances parallel to the projection vector.

23. The method of claim 19, further comprising:
deciding whether to deteimine a third projection vector in consideration of at least one of the classified and the unclassified data.

24. The method of claim 23, wherein the deciding operation comprises determining whether to perform a principle component analysis on at least some of the data.

25. The method of claim 23, wherein the deciding operation comprises determining whether to determine a projection vector that maximizes overall variance of at least some of the data.

26. The method of claim 25, wherein the projection vector that maximizes overall variance of at least some of the data comprises a principle component eigenvector.

27. The method of claim 23, wherein the deciding operation comprises consideration of a range of the classified data.

28. The method of claim 23, wherein the deciding operation comprises consideration of width of a histogram formed by binned distances.

29. One or more non-transitory tangible computer-readable storage media encoding computer-executable instructions for executing on a computer system a computer process comprising:
determining a projection vector for data of an image data set in a multidimensional property space wherein the projection vector maximizes a ratio of between-class scatter to within-class scatter of the image data set using a processor;
determining a reference on the projection vector using the processor;
classifying at least some of the data into a plurality of unambiguously defined data classes based on a nesting analysis of distances of the data from the reference using the processor;
eliminating at least some of the unambiguously defined classified data classes from the image data set based on the classification operation to produce a modified image data set containing only unclassified data using the processor; and
determining another projection vector for the unclassified data of the modified image data set that maximizes a ratio of between-class scatter to within-class scatter of the modified image data set using the processor.

* * * * *

UNITED STATES PATENT AND TRADEMARK OFFICE
CERTIFICATE OF CORRECTION

PATENT NO. : 8,086,049 B2
APPLICATION NO. : 12/799459
DATED : December 27, 2011
INVENTOR(S) : Trifonov et al.

It is certified that error appears in the above-identified patent and that said Letters Patent is hereby corrected as shown below:

On the Face Page, in Field (56), under "OTHER PUBLICATIONS", in Column 2, Line 1, delete "Fisher'S" and insert -- Fisher's --, therefor.

In Column 7, Line 50, delete "$z_i$" and insert -- $z_1$ --, therefor.

In Column 11, Line 20, delete "class,j," and insert -- class j, --, therefor.

In Column 18, Line 17, in Claim 23, delete "deteimine" and insert -- determine --, therefor.

Signed and Sealed this
Fifteenth Day of January, 2013

David J. Kappos
*Director of the United States Patent and Trademark Office*